(No Model.)
J. W. WALKER.
RUNNING GEAR FOR VEHICLES.
No. 244,099. Patented July 12, 1881.
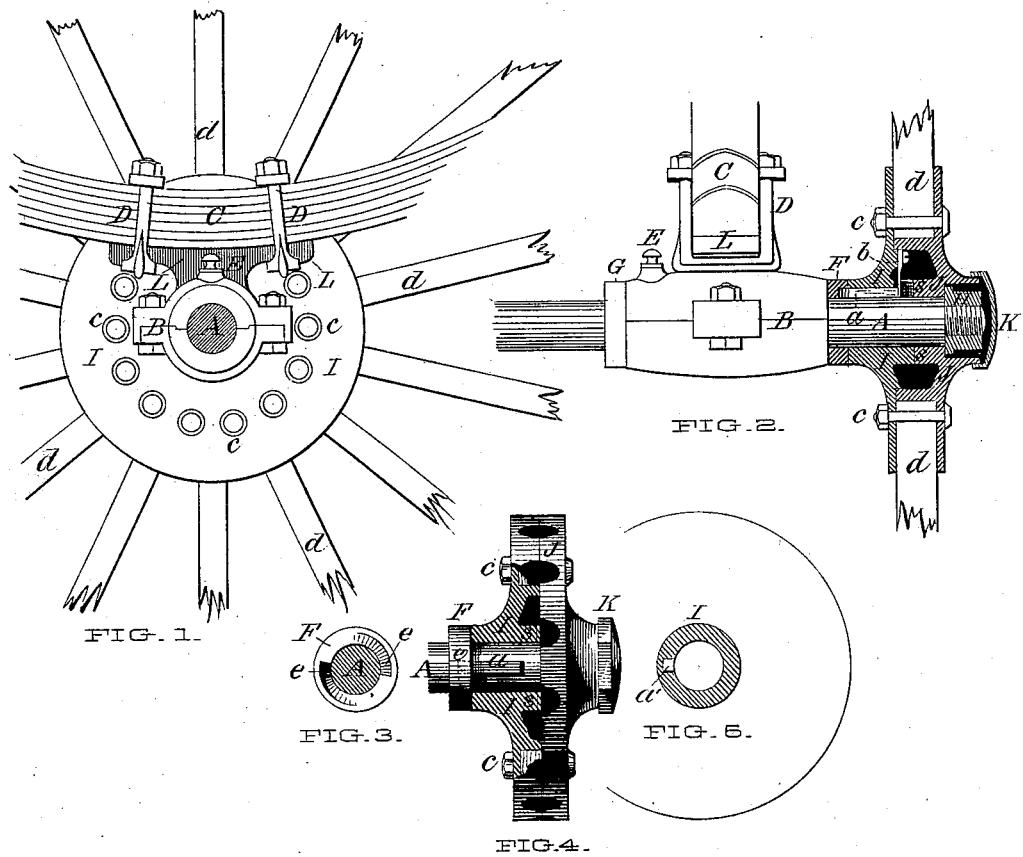
WITNESSES,
H. D. Hall
S. E. Burgess
INVENTOR,
JAMES W. WALKER,
by Franklin Scott, Attorney

UNITED STATES PATENT OFFICE.

JAMES W. WALKER, OF COHOES, NEW YORK, ASSIGNOR OF ONE-HALF TO PATRICK CARROLL, OF SAME PLACE.

RUNNING-GEAR FOR VEHICLES.

SPECIFICATION forming part of Letters Patent No. 244,099, dated July 12, 1881.

Application filed July 7, 1880. (No model.)

*To all whom it may concern:*

Be it known that I, JAMES W. WALKER, of the city of Cohoes, in the county of Albany and State of New York, have invented certain Improvements in the Running-Gear of Wagons and Carriages, of which the following is a specification, reference being had to the accompanying drawings, which constitute a part of said specification.

In a majority of vehicles in common use the axles are made stationary, and each wheel is made to revolve independently thereon, and the friction resulting from the running of the vehicle is almost wholly confined to the surfaces in contact in the inside of the wheel-hub, being the under side of the axle-arm or skein and the box in the wheel-hub. In contradistinction with this system loose axles running in stationary boxes attached to some part of the platform or of the carriage or wagon body have been devised, upon which axles the wheels loosely revolve, so that the wear may not be wholly within the hub between the box and the axle-arm, nor wholly on one side of the axle-arm, but may be divided between the axle-arm and the journals on the axle itself, or may, by appropriate devices, be wholly transmitted to the journal-bearings of the axle independent of the wheel.

This invention relates to special construction of vehicle-wheel hubs, and to special provisions connected therewith, and with a rolling axle, whereby the motion of the wheel may always be transmitted to the axle when the vehicle is moving forward, to the end that there may be no motion of the wheel upon the arm of the axle, but that all wear and friction, when so used, shall be transferred to journal-bearings on the main axle, as hereinafter more fully set forth.

Figure 1 is an elevation of the inside of an ordinary carriage-wheel, showing the position of the axle and stationary axle-box; also its mode of attachment to a platform-spring of a wagon-body. Fig. 2 is a view, from the rear of the vehicle, of the parts shown in Fig. 1, exhibiting, in diametrical section, the construction of the interior of the hub of the wheel, and the appliances whereby the axle is rotated by the wheel. Fig. 3 is a face view of stationary collar F shown in Figs. 2 and 4. Fig. 4 is a partial diametrical section of the wheel-hub, taken on a plane at right angles with the plane of section shown in Fig. 2. Fig. 5 is an end view of the hub-projection of the plate I, showing the slot or way $a'$, in which the clutch-dog $a$ works.

It is well known that where the axle of a vehicle is rigidly fixed and the wheel revolves thereon, the whole wear upon the axle comes upon its under side, and after long usage the wheel ceases to run truly, the axle plays loosely in the axle-box, and a large amount of lateral play or vibration ensues, which, in pleasure-vehicles, is extremely disagreeable and annoying, and in heavy wagons designed for freight devolves extra labor and annoyance upon the horses. In consequence of such one-sided wear, axles become weakened, and are then liable to be easily bent or sprung.

The old system exhibits another disadvantage, in the exposure of the ends of the hub to the admission of mud and dirt from the wheel, which further assists to speedily cut away the axle and axle-box; and in most cases the wheels have to be removed for purposes of cleaning and oiling the axle, when necessary.

All these objectionable features are removed or avoided by my improvements.

My invention is used in connection with a straight axle or shaft upon each end of which revolves a wheel. The shaft or axle is provided with flanges or collars on each side of each stationary journal-box in which it revolves, and such journal-boxes are rigidly attached to some part of the frame-work or running-gear of the vehicle. The collars prevent longitudinal play.

The hub of each wheel is provided with my improved device, whereby a positive rotary motion may be imparted from the wheel to the shaft when the vehicle advances, but not necessarily so when it is cramped or backed.

Each of the journal-boxes is provided with an oil-chamber, and may be lubricated without disturbing the wheels. In this instance I have shown a journal-box, B, provided with an oiler, E, and having a saddle, L, constructed upon its upper side for the purpose of receiving the spring C, which is firmly secured thereto by means of the clips or stirrups D D.

On either side of box B, upon the axle A, are the rigid collars F G. Upon the side of collar F toward the hub of the wheel are as many sockets or recesses $e\ e$ as experience may determine expedient, in which the outer end of clutch-dog $a$ finds engagement.

The hub of the wheel I have shown made in two disks bolted together, showing a joint or union at $s\ s$, at or near the center of the hub. The inner half of the hub I has a slot or way, $a'$, cut longitudinally through its eye, in which works the dog $a$. When in place this dog is controlled in its longitudinal movement by a small spring, $b$, Fig. 2, which is suitably adjusted and attached within the chamber of the hub I J, the thrust of which is exerted toward the collar F in such a way as to keep the end of the clutch-dog $a$ in constant contact with collar F.

The sockets $e\ e$ of collar F are cam-shaped, as indicated in Figs. 3 and 4, so that when the wheel rotates backwardly the clutch-dog will glide over the intervals between the sockets.

The wheel is confined in place on the axle by a thread and nut, H, in the usual way, and the outer end of the hub may be capped to exclude dirt and dust, as at K, if desired.

The object of providing the clutch arrangement shown, whereby the wheel drives the axle by imparting a positive motion thereto, is to absolutely transfer all friction and wear from the axle-box in the hub to the journal-boxes B B, which may be renewed, if worn out, or repaired or relined with bronze, Babbitt, or any anti-friction lining, much more cheaply and expeditiously than the old wheel and fixed axle could be repaired. Besides, by placing the boxes B B inside or between the wheels, they are better protected from mud and dirt in seasons of bad roads.

My system of devices may equally well be applied to individual wheels where a short axle is employed, and therefore I do not restrict myself to axles carrying two wheels.

I claim as new and desire to protect by Letters Patent—

A vehicle-axle adapted to revolve in stationary journal-boxes attached to the body of the vehicle, or some appurtenance thereof, provided with fixed flanges next to the inner end of the hub of the wheel, which flanges have provisions for engagement with a driving pawl or clutch-dog in the rear end of the wheel-hub, in combination with a wheel carrying within its hub a driving clutch-dog or pawl actuated by a spring, the whole being so constructed that when the parts are adjusted for use the back end of the hub shall maintain close contact with the flange of the axle, for the purpose of securely inclosing the clutch devices, and of excluding dirt therefrom, substantially as described and set forth.

In testimony whereof I have hereto subscribed my name at Cohoes, New York, this 29th day of June, A. D. 1880.

JAMES W. WALKER.

In presence of—
 JOHN F. PORTER,
 L. J. THIESSEN.